(12) United States Patent
Kakadia et al.

(10) Patent No.: US 9,176,784 B2
(45) Date of Patent: Nov. 3, 2015

(54) LOAD BALANCING

(75) Inventors: Deepak Kakadia, Union City, CA (US); Ken Duda, Menlo Park, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1556 days.

(21) Appl. No.: 12/636,132

(22) Filed: Dec. 11, 2009

(65) Prior Publication Data

US 2011/0145390 A1 Jun. 16, 2011

(51) Int. Cl.
*G06F 15/173* (2006.01)
*G06F 9/50* (2006.01)
*H04L 29/08* (2006.01)

(52) U.S. Cl.
CPC ............ *G06F 9/505* (2013.01); *H04L 67/1002* (2013.01); *H04L 67/1029* (2013.01); *H04L 67/1034* (2013.01)

(58) Field of Classification Search
USPC ............................ 709/227, 217, 202; 370/252
See application file for complete search history.

(56) References Cited

U.S. PATENT DOCUMENTS

| | | | | |
|---|---|---|---|---|
| 6,601,101 B1 * | 7/2003 | Lee et al. | | 709/227 |
| 6,665,702 B1 | 12/2003 | Zisapel et al. | | |
| 6,788,692 B1 | 9/2004 | Borden et al. | | |
| 6,826,613 B1 * | 11/2004 | Wang et al. | | 709/227 |
| 6,856,991 B1 * | 2/2005 | Srivastava | | 1/1 |
| 7,047,315 B1 * | 5/2006 | Srivastava | | 709/238 |
| 7,088,718 B1 * | 8/2006 | Srivastava | | 370/392 |
| 7,305,429 B2 * | 12/2007 | Borella | | 709/203 |
| 7,490,164 B2 * | 2/2009 | Srivastava | | 709/238 |
| 7,512,702 B1 * | 3/2009 | Srivastava et al. | | 709/238 |
| 7,650,427 B1 * | 1/2010 | Liu et al. | | 709/238 |
| 7,769,886 B2 * | 8/2010 | Naseh et al. | | 709/238 |
| 8,170,940 B2 * | 5/2012 | Tully et al. | | 705/36 R |
| 8,180,896 B2 * | 5/2012 | Sakata et al. | | 709/226 |
| 8,266,319 B2 * | 9/2012 | Zisapel et al. | | 709/238 |
| 2003/0061304 A1 * | 3/2003 | Tenereillo et al. | | 709/217 |
| 2006/0013147 A1 * | 1/2006 | Terpstra et al. | | 370/252 |
| 2006/0112170 A1 * | 5/2006 | Sirkin | | 709/217 |
| 2006/0193252 A1 * | 8/2006 | Naseh et al. | | 370/225 |
| 2007/0036242 A1 * | 2/2007 | Gotou | | 375/318 |
| 2007/0136242 A1 * | 6/2007 | Auvenshine et al. | | 707/3 |
| 2009/0276842 A1 * | 11/2009 | Yevmenkin et al. | | 726/13 |
| 2010/0036903 A1 * | 2/2010 | Ahmad et al. | | 709/202 |
| 2010/0036954 A1 * | 2/2010 | Sakata et al. | | 709/226 |
| 2011/0145390 A1 * | 6/2011 | Kakadia et al. | | 709/224 |
| 2011/0314119 A1 | 12/2011 | Kakadia et al. | | |
| 2012/0198045 A1 * | 8/2012 | Sakata et al. | | 709/223 |
| 2012/0215915 A1 * | 8/2012 | Sakata et al. | | 709/224 |

FOREIGN PATENT DOCUMENTS

WO WO-2006/072114 6/2006

OTHER PUBLICATIONS

Wollman H Jegers The Mitre Corporation Server Load Balancing Registration Protocol W: "Server Load BalancingRegistration Protocol; draft-wollman-slbrp-OO.txt", IETF Standard-Working-Draft, Internet Engineering Task Force, IETF, CH, Nov. 1, 2003.

* cited by examiner

*Primary Examiner* — Tammy Nguyen

(57) ABSTRACT

A device may include a memory and logic. The logic may be configured to monitor a number of computer devices associated with a service, identify, based on the monitoring, whether any of the computer devices is experiencing a problem or is unavailable, and store, in the memory, information identifying each of the computer devices that is experiencing a problem or is unavailable. The logic may also be configured to receive a client request for the service, the client request being directed to a virtual Internet protocol (VIP) address associated with the device. The logic may be further configured to identify one of the computer devices to which the request is to be forwarded, and forward the request to the identified computer device.

20 Claims, 7 Drawing Sheets

LOAD BALANCING

BACKGROUND INFORMATION

Service providers often attempt to balance the processing load associated with providing their services. One drawback with conventional load balancing is that the load balancing is typically performed across multiple layers and platforms. As a result, there are multiple levels of failure associated with the load balancing.

For example, in conventional network architectures, a client device may connect with a router to attempt to access a service. The router may interact with one or more domain name systems (DNSs) and global load balancing platforms to identify an Internet protocol (IP) address associated with the desired service. Once an IP address is identified, the router may forward the request to a local load balancing platform that will attempt to forward the request to an available server. Such an approach has many drawbacks. For example, the client may receive an initially valid IP address from a DNS resolver, but accessing the desired service may fail at any point in time thereafter. In such instances, the client will not know whether there is an alternate IP address for the service. Therefore, the client will try to connect to the IP address, wait a period of time and retry to establish a connection one or more times. During this period of time, the DNS entry in the client may expire based on a time-to-live (TTL) value and the DNS server will have to be queried again for a new valid IP address. Such processing consumes time and significant network resources.

Another problem with conventional architectures is the requirement for multiple layers of load balancers. For example, conventional architectures include a global server load balancing layer/platform, as well as a local server load balancing layer/platform. Each load balancing layer/platform contributes to packet latencies and adds devices to the service provider's facilities. These devices consume rack space, power and cooling resources.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein relate to an architecture that provides load balancing associated with a service, such as an IP-related service. In one implementation, the architecture provides an integrated control and data plane that provides a number of load balancers accessible via a single virtual IP (VIP) address. Each of the load balancers may advertise the VIP address such that routing devices in a network are able to forward requests from clients to an appropriate one of the load balancers. In addition, each of the load balancers may monitor a number of servers that provide the service. If one or more of the servers are experiencing a problem, such as an overload or congestion condition, the load balancer may eliminate that server from receiving client requests.

Figure 1:
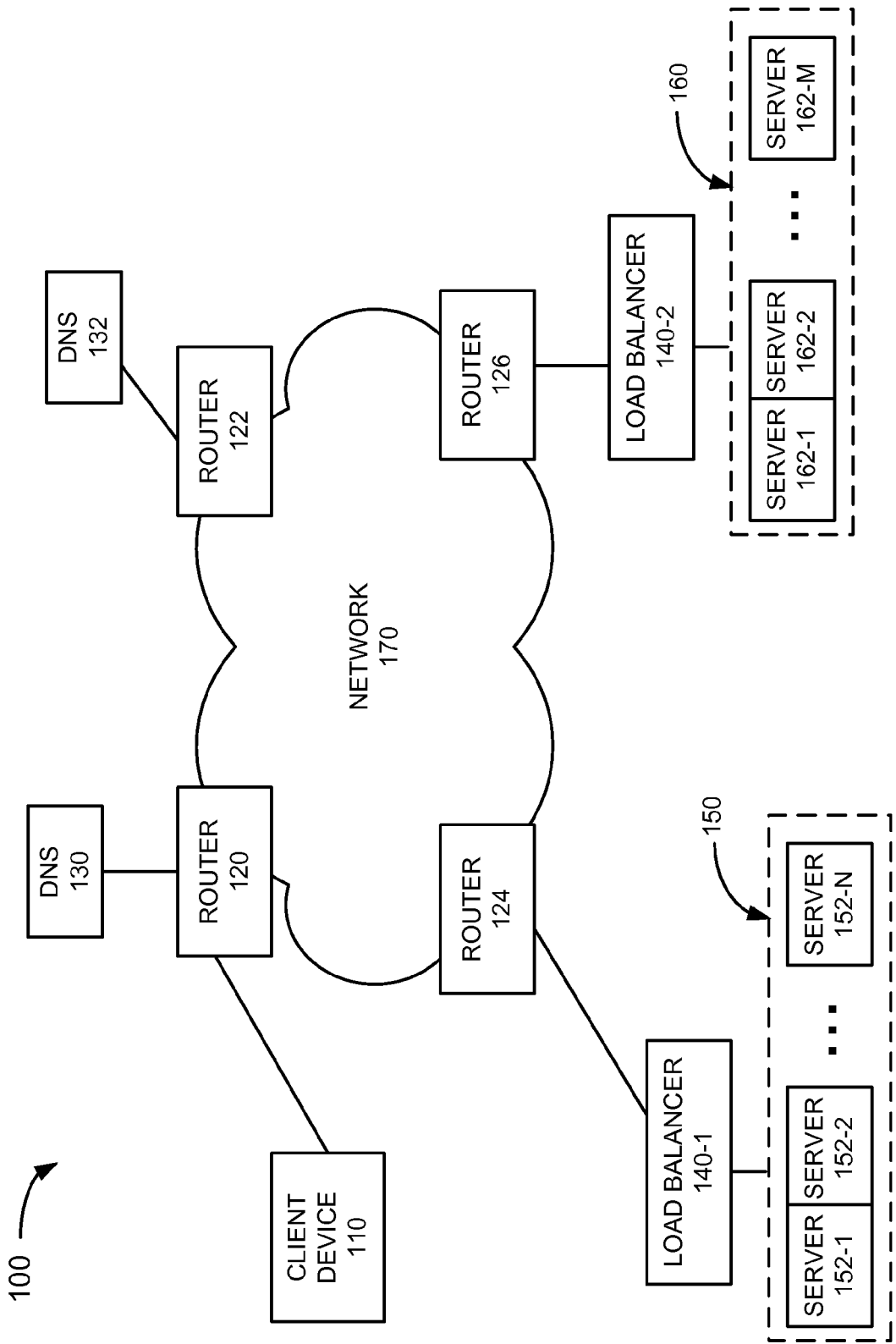
FIG. 1 illustrates an exemplary network in which systems and methods described herein may be implemented.

FIG. 1 is a block diagram of an exemplary network 100 in which systems and methods described herein may be implemented. Network 100 may include client device 110, routers 120, 122, 124 and 126, domain name system (DNS) 130 and DNS 132. Network 100 may also include load balancers 140-1 and 140-2, referred to individually as load balancer 140 or 140-N and collectively as load balancers 140, server pool 150 and server pool 160. Network 100 may further include network 170.

Client device 110 may include any type of device that is able to transmit and receive data, such as text data, video data, image data, audio data, multi-media data, etc. In an exemplary implementation, client device 110 may include some type of computer, such as a personal computer (PC), laptop computer, etc., a personal digital assistant (PDA), a web-based appliance, a mobile terminal (e.g., a cellular telephone), etc.

Routers 120, 122, 124 and 126 may each include any type of network routing device, such as a router or switch, used to receive incoming communications, identify destination information associated with the incoming communication and route the communication toward its intended destination. DNS 130 and DNS 132 may each include one or more devices/systems that translate or resolve a name associated with a destination or service to an address (e.g., an IP address).

Load balancers 140 may each include one or more logic devices that receive communications and identify an appropriate server from a local server pool (e.g., server pool 150 or 160) to process the communications. In an exemplary implementation, load balancers 140 may identify congested servers or unavailable servers in server pools 150 and 160 and avoid sending communications to the congested/unavailable servers.

Server pools 150 and 160 may each include a number of servers or other computing devices associated with servicing customer requests. For example, server pool 150 may include a number of servers labeled 152-1 through 152-N, where N represents any integer. Similarly, server pool 160 may similarly include a number of servers labeled 162-1 through 162-M, where M represents any integer.

Network 170 may include one or more wired, wireless and/or optical networks that are capable of receiving and transmitting data, voice and/or video signals, including multimedia signals that include voice, data and video information. For example, network 170 may include one or more public switched telephone networks (PSTNs) or other type of switched network. Network 170 may also include one or more wireless networks and may include a number of transmission towers for receiving wireless signals and forwarding the wireless signals toward the intended destinations. Network 170 may further include one or more satellite networks, one or more packet switched networks, such as an IP based network, a local area network (LAN), a wide area network (WAN), a personal area network (PAN) (e.g., a wireless PAN), an intranet, the Internet, or another type of network that is capable of transmitting data.

The exemplary configuration illustrated in FIG. 1 is provided for simplicity. It should be understood that a typical network may include more or fewer devices than illustrated in FIG. 1. For example, one client device 110, four routers 120-126, two DNSs 130 and 132, two load balancers 140 and two server pools 150 and 160 are shown for simplicity. It should be understood that network 100 may include a large number (e.g., hundreds or thousands) of client devices, routers, load balancers, DNSs and server pools. Network 100 may also include additional elements, such as switches, gateways, backend systems, etc., that aid in routing information in network 100. In addition, although the various devices illustrated in FIG. 1 are shown as separate devices in FIG. 1, in other implementations, the functions performed by two or more of these devices may be performed by a single device or platform. In addition, in some implementations, the functions described as being performed by a particular device may alternatively be performed by a different device.

Figure 2:
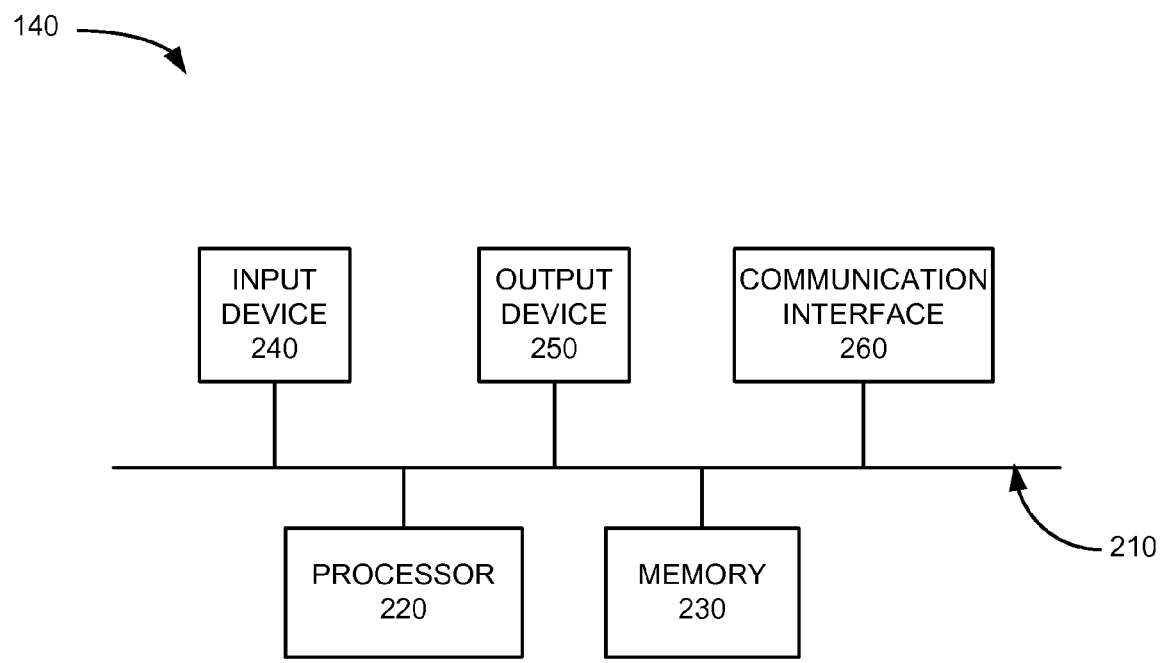
FIG. 2 illustrates an exemplary configuration of one or more of the components of FIG. 1.

FIG. 2 illustrates an exemplary configuration of load balancer 140. Client device 110, routers 120-126, DNS 130 and 132, and each of the servers in server pools 150 and 160 may be configured in a similar manner. Referring to FIG. 2, load balancer 140 may include a bus 210, a processor 220, a memory 230, an input device 240, an output device 250 and a communication interface 260. Bus 210 may include a path that permits communication among the elements of load balancer 140.

Processor 220 may include one or more processors, microprocessors, or processing logic that may interpret and execute instructions. Memory 230 may include a random access memory (RAM) or another type of dynamic storage device that may store information and instructions for execution by processor 220. Memory 230 may also include a read only memory (ROM) device or another type of static storage device that may store static information and instructions for use by processor 220. Memory 230 may further include a solid state drive (SDD). Memory 230 may also include a magnetic and/or optical recording medium (e.g., a hard disk) and its corresponding drive.

Input device 240 may include a mechanism that permits a user to input information to load balancer 140, such as a keyboard, a keypad, a mouse, a pen, a microphone, a touch screen, voice recognition and/or biometric mechanisms, etc. Output device 250 may include a mechanism that outputs information to the user, including a display, a printer, a speaker, etc.

Communication interface 260 may include any transceiver-like mechanism that load balancer 140 may use to communicate with other devices (e.g., router 124, router 126, server pool 150, server pool 160, etc.). For example, communication interface 260 associated with load balancer 140-1 may include mechanisms for communicating with router 124 and each of the servers 152 in server pool 150 via wired, wireless or optical mechanisms. Communication interface 260 may also include one or more radio frequency (RF) transmitters, receivers and/or transceivers and one or more antennas for transmitting and receiving RF data via network 170. Communication interface 260 may also include a modem or an Ethernet interface to a LAN or other mechanisms for communicating via a network, such as network 170 or another network via which load balancer 140 communicates with other devices/systems.

The exemplary configuration illustrated in FIG. 2 is provided for simplicity. It should be understood that load balancer 140 (and routers 120-126, DNS 130 and 132 and client device 110) may include more or fewer devices than illustrated in FIG. 2.

In an exemplary implementation, load balancer 140 may perform operations in response to processor 220 executing sequences of instructions contained in a computer-readable medium, such as memory 230. A computer-readable medium may be defined as a physical or logical memory device. The software instructions may be read into memory 230 from another computer-readable medium (e.g., a hard disk drive (HDD), SSD, etc.), or from another device via communication interface 260. Alternatively, hard-wired circuitry may be used in place of or in combination with software instructions to implement processes consistent with the implementations described herein. Thus, implementations described herein are not limited to any specific combination of hardware circuitry and software.

Figure 3:
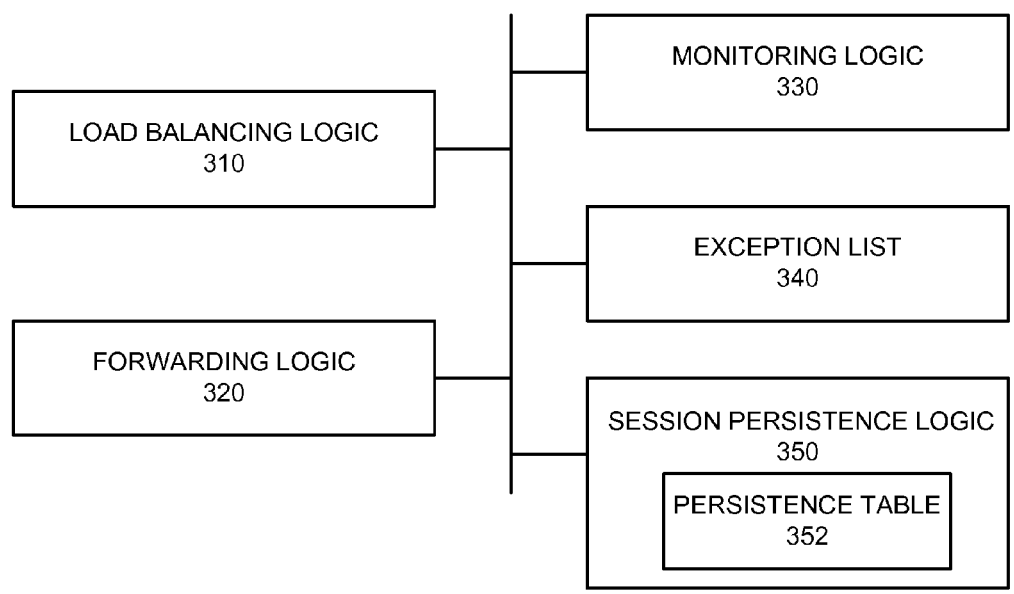
FIG. 3 illustrates an exemplary configuration of logic components implemented in one of the load balancers of FIG. 1.

FIG. 3 is an exemplary functional block diagram of each load balancer 140 according to an exemplary implementation. The logical blocks illustrated in FIG. 3 may be implemented in software, hardware, or a combination of hardware and software. For example, in one implementation, all or some of the logical blocks illustrated in FIG. 3 may be implemented by processor 220 (FIG. 2) executing software instructions stored in, for example, memory 230.

Referring to FIG. 3, load balancer 140 may include load balancing logic 310, forwarding logic 320, monitoring logic 330, exception list 340 and session persistence logic 350. Load balancing logic 310 may include logic for controlling the operation of load balancer 140. For example, load balancing logic 310 may identify an appropriate one of servers in server pool 150 (or server pool 160) to which communications from client devices, such as client device 110, should be forwarded. In an exemplary implementation, load balancing logic 310 may identify congested servers, unavailable servers, etc., and avoid sending client requests to such servers, as described in detail below.

Forwarding logic 320 may include logic for forwarding communications, such as client requests destined for one of servers 152 or 162. For example, forwarding logic 320 may forward client requests associated with access to a service in accordance with information from load balancing logic 310.

Monitoring logic 330 may include logic for monitoring servers 152 in server pool 150 (and/or servers 162 in server pool 162). For example, in one implementation, monitoring logic 330 in load balancer 140-1 may run a background daemon that continuously or periodically monitors the state of each of servers 152 in server pool 150. Monitoring logic 330 in load balancer 140-2 may perform a similar process with respect to servers 162 in server pool 160, as described in detail below. Monitoring logic 330 may then determine whether a server included in server pool 150/160 should be removed from the pool of available servers to process client requests.

Exception list 340 may include one or more memories for storing information identifying, for example, congested or overloaded servers that are no longer available to process client requests. For example, monitoring logic 330 may identify servers that are currently unavailable for processing client requests and store information identifying the unavailable servers in exception list 340. Load balancing logic 310 may access exception list 340 when identifying an appropriate server to process a client request. In an exemplary implementation, exception list 340 may be implemented using a high speed, ternary content addressable memory (TCAM). Alternatively, exception list 340 may be implemented using a high speed, static random access memory (SRAM) or via any other memory device.

Session persistence logic 350 may store state information associated with a client session. For example, a single session and/or transaction associated with a client request may include many sub-transactions that are performed by different ones of servers 152 and/or 162. In such instances, session persistence logic 350 may store state information associated with each of the sub-transactions in persistence table 352. Persistence table 352 may include one or more memory devices that include one or more databases that store and index the state information. In an alternative implementation, session persistence logic 350 and/or session persistence table 352 may be located externally with respect to load balancer 140, as described in detail below. In each case, if a problem occurs during a transaction, one of servers 152 and/or 162 may access persistence table 352 to ensure that the transaction may be completed, as described in detail below.

Load balancer 140 may receive communications from client devices, such as client device 110, intended for a service provider associated with servers 152/162 in server pools 150 and 160. Load balancer 140-1 may then identify an appropriate one of servers 152/162 to which communications are to be forwarded, as described in detail below.

Figure 4:
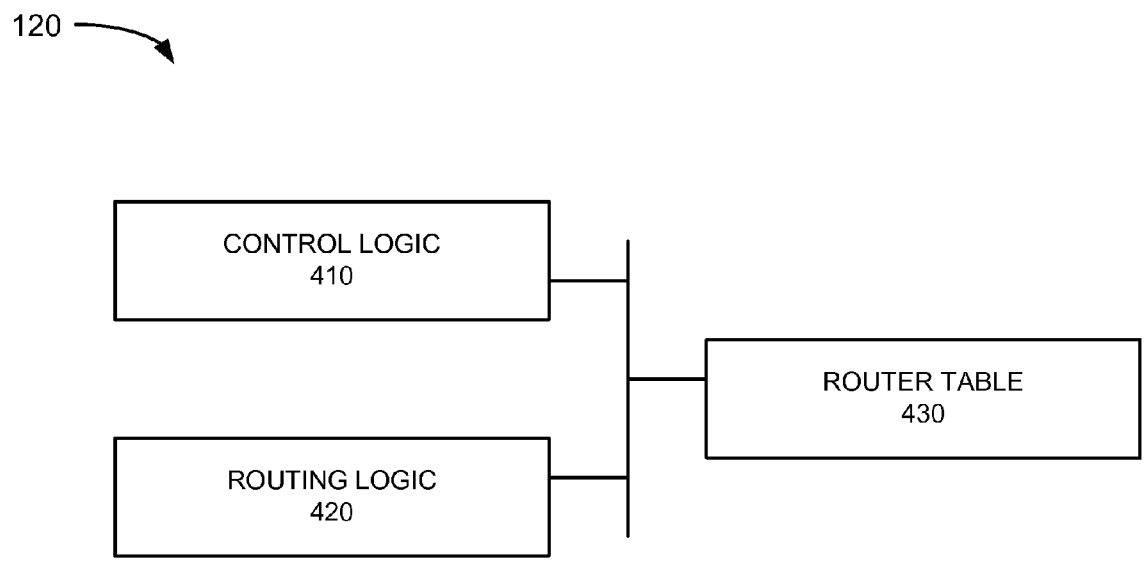
FIG. 4 illustrates an exemplary configuration of logic components implemented in one of the routers of FIG. 1.

FIG. 4 is an exemplary functional block diagram of components implemented in router 120 of FIG. 2. Routers 122, 124 and 126 may be configured in a similar manner. Referring to FIG. 4, router 120 may include control logic 410, routing logic 420 and router table 430.

Control logic 410 may include logic for controlling the operation of router 120. For example, control logic 410 may receive communications from client devices, such as client device 110, and forward the communication or a portion of the communication (e.g., the header information) to routing logic 420. Control logic 410 may also update router tables (e.g., router table 430) based on messages received from other routers in network 100. Control logic 410 may also generate or update one or more forwarding tables (not shown in FIG. 4) based on information in the router tables.

Routing logic 420 may include logic for identifying forwarding information associated with received communications. For example, routing logic 420 may access one or more router tables to identify a next hop for a received communication based on destination information (e.g., a destination IP address and/or port) included in a header of a received communication. Routing logic 420 may also receive messages, such as advertisement messages, including address information associated with devices/services in network 100.

Router table 430 may include one or more memories for storing data. For example, router table 430 may store information associated with other routers and/or services in network 100. In an exemplary implementation, control logic 410 and/or routing logic 420 may store information associated with advertised addresses in router table 430, as described in detail below.

Figure 5:
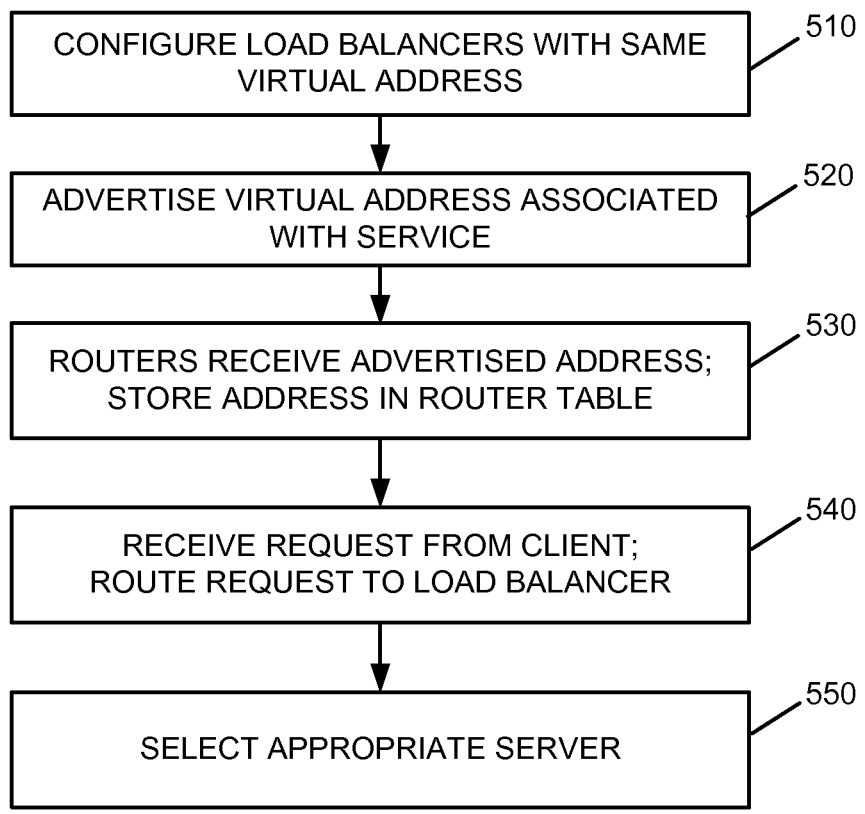
FIG. 5 is a flow diagram illustrating exemplary processing associated with the components of FIG. 1.

FIG. 5 is a flow diagram illustrating exemplary processing associated with network 100. In this example, assume that load balancers 140-1 and 140-2 are associated with a service provided by an entity via servers in server pools 150 and 160. For example, load balancers 140-1 and 140-2 may be associated with providing videos-on-demand, televisions shows, podcasts, music, etc., or providing some other service. Processing may begin by configuring load balancers 140-1 and 140-2 with the same virtual IP (VIP) address (act 510). Using a VIP address associated with multiple load balancers 140 allows DNSs 130 and 132 to store a single IP address for a particular service provided by a service provider associated with load balancers 140 and server pools 150 and 160. Using a single VIP address also allows a service provider to configure load balancers 140-1 and 140-2 in an identical manner, which simplifies the configuring and maintenance associated with load balancers 140.

Continuing with the example above, assume that a service provider associated with the service provided via servers in server pools 150 and 160 configures a service VIP address on a loopback interface of load balancers 140-1 and 140-2 to each have the IP address of 1.1.1.1. This VIP address may represent the IP address for a service to be provided by one or more servers 152 or 162 in server pool 150 or 160, respectively. It should be understood that the VIP address of 1.1.1.1 is used for explanatory purposes and any particular VIP address may be assigned to load balancers 140.

Further assume that the physical interface that connects load balancer 140-1 to its closest router (i.e., router 124 in this example), has been assigned the network IP address of 192.168.1.2. Also assume that the physical interface that connects load balancer 140-2 to its closest router (i.e., router 126 in this example) has been assigned the network IP address of 172.1.1.2. In this example, load balancer 140-1 may advertise the VIP address 1.1.1.1/32 to network 170 and load balancer 140-2 may advertise the VIP address of 1.1.1.1/32 to network 170 (act 520). For example, load balancers 140-1 and 140-2 may advertise the VIP address via interior gateway protocol (IGP) route updates that are periodically transmitted to network 170.

Routers in network 170 may receive the advertisements (act 530). For example, router 124 may receive the advertisement from load balancer 140-1 and router 126 may receive the advertisement from load balancer 140-2. Routers 124 and 126 may forward the advertised VIP address to other routers in network 170. For example, routers 124 and 126 may forward the VIP address of 1.1.1.1/32 to router 120.

Figure 6:
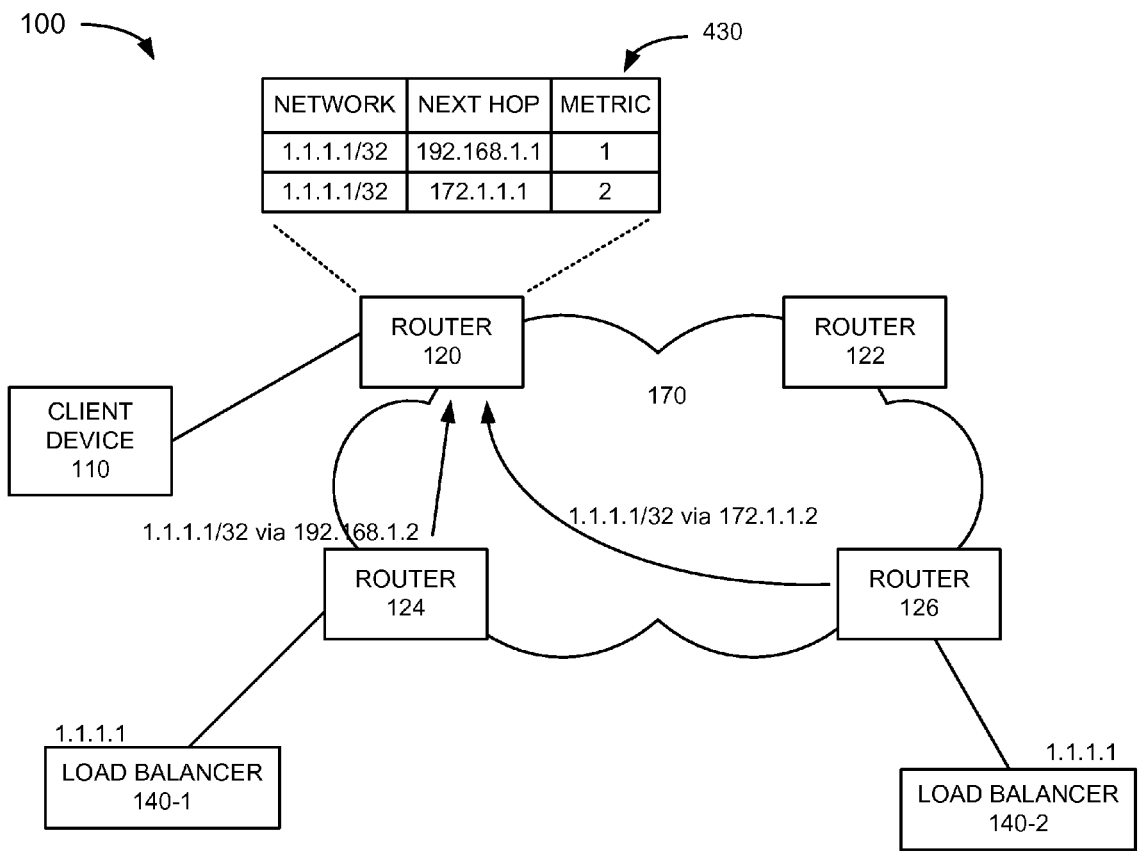
FIG. 6 illustrates a portion of the network of FIG. 1 associated with the processing of FIG. 5.

For example, FIG. 6 illustrates a portion of network 100 associated with the advertising messages forwarded to router 120. Referring to FIG. 6, router 124 may forward the VIP address of 1.1.1.1/32 via 192.168.1.2, as indicated by the line from router 124 to router 120. Similarly, router 126 may forward the VIP address of 1.1.1.1/32 via 172.1.1.2, as indicated by the line from router 126 to router 120. Router 120 may store the information associated with the VIP advertisements in router table 430 (act 530).

For example, FIG. 6 illustrates an exemplary portion of router table 430. As illustrated, routing table 430 may include a network address field, a next hop field and a metric field. The metric field illustrated in router table 430 may store the number of hops to a particular router. For example, router 124 may have an address of 192.168.1.1 and may be located one hop away from router 120, while router 126 may have a network address of 172.1.1.1 and may be located two hops away from router 120. In some implementations, control logic 410 may access a forwarding table that includes more detailed information with respect to routing a client request to one of load balancers 140.

Router 120 may receive requests from client devices, such as client device 110, and use information in its routing table 430 to automatically forward and/or load balance requests from client devices to service VIP address 1.1.1.1 based on various metrics (act 540). As an example, assume that the user at client device 110 enters a name associated with the service provided by load balancers 140 and server pools 150/160 into a web browser at client device 110 and forwards the request to router 120. Router 120 may access DNS 130 (FIG. 1) to identify an IP address associated with the name of the service. As described above, DNS 130 (and DNS 132) may store the VIP address of 1.1.1.1 as the IP address corresponding to the name of the service associated with load balancers 140. In this case, the VIP address of 1.1.1.1 may be returned to router 120.

In this example, assume that router 120 is operating in accordance with open shortest path first (OSPF) routing protocol. Routing logic 420 may then access router table 430 and determine that the IP address of 1.1.1.1 may be located one hop away via router 124 and two hops away via router 126. In this example, routing logic 420 may select router 124 as the next hop router. In other implementations, router 120 may use different routing metrics/criteria when identifying a path for forwarding client requests to one of load balancers 140-1 or 140-2.

For example, load balancer 140-1 may alter the weighting associated with routing requests from router 120, based on, for example, link cost information associated with forwarding the request, load and/or latency information associated with servers 152 and/or 162, server availability information associated with servers 152 and/or 162, or other information. In such implementations, load balancer 140-1 may incorporate these other metrics in the advertisement message that will be received by router 120. As one example, if none of the servers 152 in server pool 150 is available or all of servers 152 are experiencing significant latency problems, load balancer 140-1 may insert latency information indicating that requests to load balancer 140-1 will experience delays. In such an instance, router 120 may use this latency metric and forward requests destined for VIP address 1.1.1.1 to router 126 and eventually load balancer 140-2, even though router 126 is located further from router 120 than router 124. In this manner, router 120 may effectively participate in the load balancing with respect to forwarding client requests to one of load balancers 140-1 or 140-2.

In this example, assume that router 120 routes the request from client device 110 to load balancer 140-1 via router 124. Load balancer 140-1 may then select the appropriate server in server pool 150 to process the client request (act 550). For example, load balancer 140 may perform a load balancing function to identify one of servers 152 to service the client request, as described in detail below.

Figure 7:
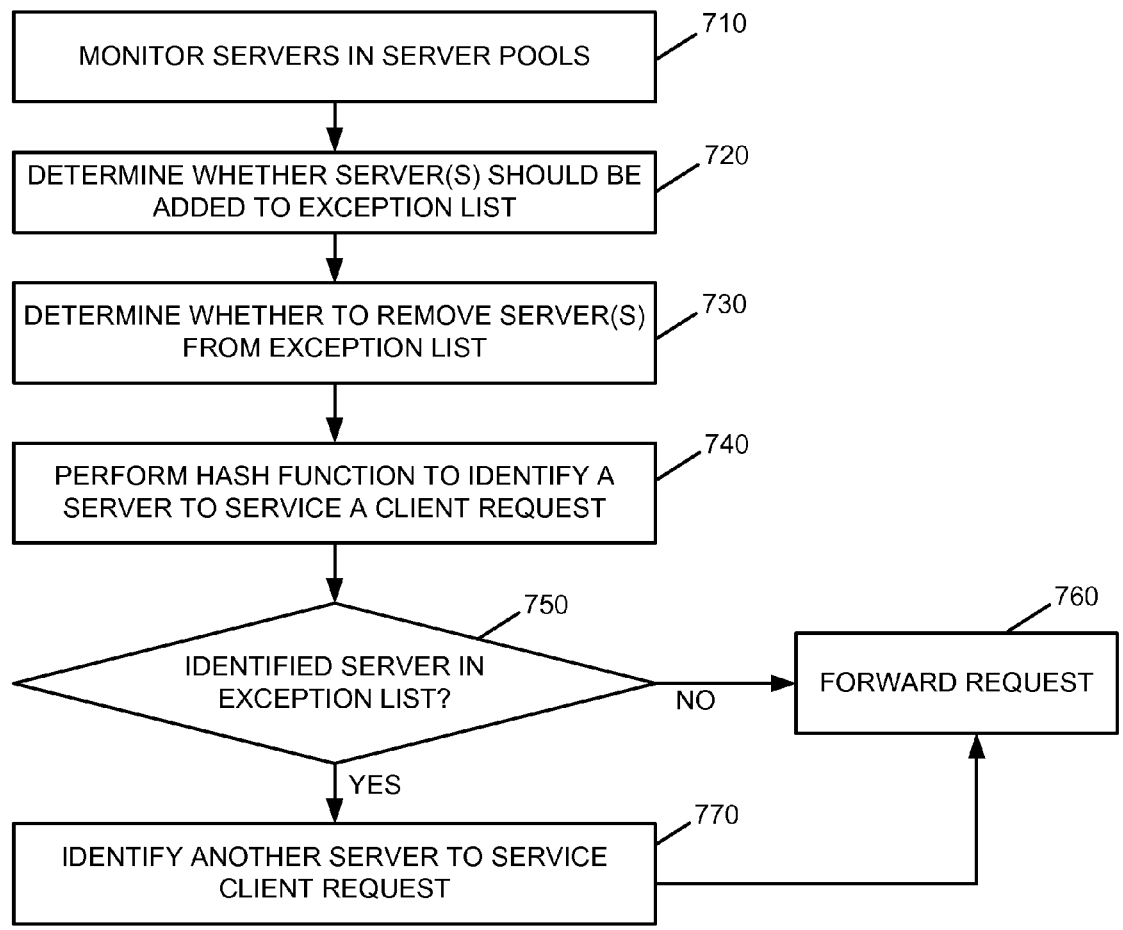
FIG. 7 is a flow diagram illustrating exemplary processing associated with the load balancer of FIG. 3.

FIG. 7 illustrates exemplary processing associated with selecting the appropriate server discussed above with respect to act 550. Processing may begin with load balancer 140-1 monitoring servers in server pool 150 (act 710). For example, as described above, monitoring logic 330 may run a background daemon that monitors the state of each of the servers 152-1 through 152-N in server pool 150. In one implementation, the daemon may perform periodic health checks to determine the state of servers 152.

For example, monitoring logic 330 may generate requests that may be similar to actual client requests and forward the requests to each of servers 152-1 through 152-N in server pool 150. Monitoring logic 330 may then record response times, delays or other measurements associated with responses to each of the requests from each of servers 152-1 through 152-N. Monitoring logic 330 may then determine whether any of servers 152 should be added to exception list 340 as being unavailable for processing client requests (act 720). For example, if monitoring logic 330 determines that the delay associated with server 152-2 processing a client request is above a predetermined threshold, monitoring logic 330 may add server 152-2 to exceptions list 340. As discussed above, a server 152 identified in exception list 340 may be unavailable to process client requests.

Alternatively, if monitoring logic 330 determines that a server 152 stored in exception list 340 has recovered (e.g., the latency associated with processing a client request is now below the predetermined threshold), monitoring logic 330 may remove that server 152 from exceptions list 340 (act 730). In some implementations, monitoring logic 330 may also monitor the availability of the VIP address (e.g., 1.1.1.1 in this example) and load balancer 140 may withdraw the advertisement of the VIP address if the VIP address (e.g., 1.1.1.1) itself is not available. In still other implementations, if monitoring logic 330 determines that all servers 152 in server pool 150 are not performing satisfactorily, load balancer 140 may withdraw the advertisement associated with VIP address 1.1.1.1.

Assume that client device 110 requests a service associated with the VIP address (i.e., 1.1.1.1) corresponding to load balancer 140-1 via router 120, as described above with respect to FIG. 5. Load balancing logic 310 may identify one of servers 152-1 through 152-N in server pool 150 to receive the request (act 740). For example, load balancing logic 310 may perform a hash function to identify a target server in server pool 150. In one implementation, load balancing logic 310 may perform a hash of the source IP address, destination IP address, source port and destination port associated with the client request. Alternatively, load balancing logic 310 may perform a hash function based on a subset (e.g., two or more) of the source IP address, destination IP address, source port or destination port. In still other alternatives, load balancing logic 310 may hash on other information associated with the client request. In each case, the output of the hash function may then be mapped to one of servers 152-1 through 152-N.

After computing the hash function, load balancing logic 310 may access exception list 340 to determine whether the identified server is in exception list 340 (act 750). If the identified server is not in exception list 340 (act 750—no), the request from client device 110 may be forwarded to the target server (act 760). The target server 152 may then respond to the client request (e.g., provide the desired service, information, etc.).

If, however, the target server 152 is in exception list 340 (act 750—yes), this may mean that the target server 152 cannot handle client requests. In this case, load balancing logic 310 may compute another hash function to find another target server 152 in server pool 150 (act 770). For example, load balancing logic 310 may compute a hash value based on information other than that used in the first hash function. Alternatively, load balancing logic 310 may identify the next sequential server in server pool 150. For example, if the initial hash function output is mapped to target server 152-3 and server 152-3 is identified in exception list 340, monitoring logic 310 may identify server 152-4 as the target server. If server 152-4 is in exception list 340, load balancing logic 310 may continue to attempt to identify an available server by either executing a different hash function or selecting another one of the available servers not in exception list 340. Once an available server is identified, the client request may be forwarded to the identified target server 152 (act 760). The target server may then respond to the client request (e.g., provide the desired service, information, etc.).

In an exemplary implementation, load balancer 140-1 may not require the load to be balanced across each of servers 152-1 through 152-N. For example, in some implementations, results of the hashing function that identify a target server may result in one of servers 152 receiving more requests than another one of servers 152. In such an implementation, as long as the server 152 processing the most client requests is not overloaded, no additional load balancing may be needed. As an example, servers 152-1, 152-2 and 152-3 may be handling 10%, 20% and 70%, respectively, of client requests. As long as monitoring logic 310 determines that server 152-3 is not overloaded or congested, no additional load balancing between servers 152 is required. This may save additional time with respect to processing client requests as compared to load balancing in an environment where each server 152 must handle approximately the same load.

As discussed above, server pools 150 and 160 may each include a number of different servers. In some implementations, a client session may be made of many sub-transactions that span several different servers 152 and/or 162. In such a case, load balancer 140 may implement session persistence functionality. For example, session persistence logic 350 (FIG. 3) may store state information associated with a session in persistence table 352.

In one implementation, session persistence logic 350 may receive state information from each of servers 152 and 162 that may be performing processing associated with a client session. For example, load balancers 140 and servers 152/162 may share information using a protocol that allows state information to be forwarded from servers 152/162 to load balancers 140. In such an implementation, load balancers 140-1 and 140-2 may receive and/or request state information from servers 152/162. Session persistence logic 350 may store the state information in persistence table 352, which may be globally accessible to each of servers 152 and/or 162. In this manner, each of servers 152 and/or 162 may access state information stored in persistence table 352 to retrieve information associated with a client session.

In another implementation, each of servers 152 and 162 may store state information in a globally accessible memory that is not contained within load balancer 140. For example, persistence table 352 may be located within server pool 150 and/or 160. In this case, each of servers 152 and/or 162 may update persistence table 352 with state information regarding a client session in progress.

Storing state information may be important if one of servers 152 and/or 162 fails during processing. For example, if a client session is associated with performing a banking transaction, several of servers 152 may be involved in the client session/processing. If one of the servers 152 involved in the transaction experiences some problem, another one of servers 152 may access persistence table 352 to retrieve state information associated with a portion of the transaction. This may enable server pools 150 and 160 to avoid losing information associated with a transaction that is in progress.

Implementations described herein provide for load balancing processing associated with a service over a number of server or computer devices. This may allow for efficient utilization of resources associated with providing services to client or customers, while also minimizing delays with respect to providing the service. In addition, the load balancing architecture described herein is easily scalable to support any type of service that may receive large numbers of client requests.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, in the implementations described above, one or more load balancers 140 and server pools 150/160 were described as being associated with a service provider providing a particular service (e.g., IP-based service). In some implementations, load balancers 140 may be operated and/or provided by an entity that is distinct from the entity providing the service. For example, an entity associated with managing resources for a service provider may operate load balancers 140 on behalf of the entity associated with the server pools (e.g., server pools 150 and 160).

In addition, features have been described above with respect to load balancers 140 performing a number of functions associated with processing client requests. In some implementations, some or all of the processing performed by load balancers 140 may be performed in hardware at near wire speeds, as opposed to being performed in software, which may cause additional latency. In each case, the load balancing may be performed in a single layer/platform that enables client requests to be efficiently processed.

In addition, while series of acts have been described with respect to FIGS. 5 and 7, the order of the acts may be varied in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A system, comprising:
a plurality of load balancers configured to receive requests associated with a first service, each of the plurality of load balancers having a same virtual Internet protocol (VIP) address, wherein each of the plurality of load balancers comprises:
a memory, and
logic configured to:
advertise the VIP address via an interior gateway protocol,
monitor a plurality of computer devices, wherein each of the plurality of computer devices is configured to provide the first service,
identify, based on the monitoring, whether any of the plurality of computer devices is experiencing a problem or is unavailable to provide the first service,
store, in the memory, information identifying each of the plurality of computer devices that is experiencing a problem or is unavailable to provide the first service, receive a client request for the first service,
identify one of the plurality of computer devices to which the request is to be forwarded, and
forward the request to the identified computer device,
wherein when advertising the VIP address, the logic is configured to:
insert a metric into an advertisement, the metric comprising latency information associated with the plurality of computer devices being monitored by the logic.

2. The system of claim 1, wherein when identifying one of the plurality of computer devices, the logic is further configured to:
perform a hash function to identify a first one of the computer devices.

3. The system of claim 2, wherein when identifying one of the plurality of computer devices, the logic is further configured to:
access the memory to determine whether information identifying the first computer device is stored in the memory, and
select, when information identifying the first computer device is stored in the memory, another one of the computer devices.

4. The system of claim 3, wherein when selecting another one of the computer devices, the logic is configured to:
perform a second hash function to identify a second one of the computer devices or select a second one of the computer devices based on the first computer device.

5. The system of claim 1, wherein
the metric further comprises at least one of link cost or availability information associated with at least some of the plurality of computer devices.

6. The system of claim 1, wherein when monitoring the plurality of computer devices, the logic is configured to:
transmit requests to each of the computer devices,
measure response times associated with each of the requests from each of the computer devices, and
determine whether any of the computer devices is experiencing a problem or is unavailable based on the response times.

7. The system of claim 6, wherein the memory is configured to store information identifying a first one of the computer devices, and wherein the logic is further configured to:
remove information identifying the first computer device from the memory if the response time from the first computer device is less than a threshold value.

8. The system of claim 7, wherein the logic is further configured to:
continuously update the memory based on the monitoring.

9. A method, comprising:
configuring a plurality of load balancers with a same virtual Internet protocol (VIP) address, the VIP address being associated with a first service;
advertising, by each of the load balancers, the VIP address;
monitoring, by each of the plurality of load balancers, a plurality of computer devices, wherein each of the plurality of computer devices is configured to provide the first service;
identifying, based on the monitoring, whether any of the computer devices is unavailable for processing client requests associated with the first service;
storing, in a memory, information identifying each of the plurality of computer devices unavailable for processing client requests;
receiving, at a first one of the load balancers, a client request for the service;
identifying, by the first load balancer, one of the plurality of computer devices to which the request is to be forwarded; and
forwarding the client request to the identified computer device,
wherein advertising the VIP address comprises:
including a metric in an advertisement message, the metric comprising at least one of latency or load information associated with providing the first service by the load balancer advertising the VIP address, wherein a router receiving the client request uses the metric to identify the first load balancer.

10. The method of claim 9, wherein
the metric further comprises at least one of link cost or availability information.

11. The method of claim 9, wherein the identifying one of the computer devices comprises:
performing a hash function based on at least two of a source address, a destination address, a source port or a destination port associated with the client request.

12. The method of claim 11, wherein identifying one of the computer devices further comprises:
identifying a first computer device,
determining whether information identifying the first computer device is stored in the memory, and
selecting, when information identifying the first computer device is stored in the memory, another one of the computer devices.

13. The method of claim 12, wherein selecting another one of the computer devices comprises:
performing a second hash function to identify a second one of the computer devices or selecting a second one of the computer devices numbered sequentially with respect to the first computer device.

14. The method of claim 9, wherein monitoring the plurality of computer devices comprises:
transmitting requests to each of the computer devices,
measuring response times associated with each of the requests, and
determining whether each of the computer devices is experiencing a problem or is unavailable based on the response times.

15. The method of claim 14, further comprising:
continuously updating the memory based on the monitoring.

16. A device, comprising
a memory; and
logic configured to:
monitor a plurality of computer devices associated with a first service, wherein each of the plurality of computer devices is configured to provide the first service and each of the computer devices has a same virtual Internet protocol (VIP) address,
advertise the VIP address via an interior gateway protocol,
identify, based on the monitoring, whether any of the plurality of computer devices is experiencing a problem or is unavailable to provide the first service,
store, in the memory, information identifying each of the plurality of computer devices that is experiencing a problem or is unavailable to provide the first service,
receive a client request for the first service, the client request being directed to the VIP address associated with the device,
identify one of the plurality of computer devices to which the request is to be forwarded, and
forward the request to the identified computer device, wherein when advertising the VIP address, the logic is configured to:
include a metric in an advertisement message, the metric comprising at least one of latency information or load information, wherein a router receiving the client request uses the metric to identify the device.

17. The device of claim 16, wherein when identifying one of the plurality of computer devices, the logic is further configured to:
perform a hash function to identify a first one of the computer devices,
access the memory to determine whether information identifying the first computer device is stored in the memory, and
select, when information identifying the first computer device is stored in the memory, another one of the computer devices.

18. The device of claim 16, wherein
the metric further comprises at least one of link cost or availability information.

19. The device of claim 16, wherein when monitoring the plurality of computer devices, the logic is configured to:
transmit requests to each of the computer devices,
measure response times associated with each of the requests from each of the computer devices, and
determine whether any of the computer devices is experiencing a problem or is unavailable based on the response times.

20. The device of claim 16, wherein when identifying one of the computer devices, the logic is configured to:
perform a hash function based on at least two of a source address, a destination address, a source port or a destination port associated with the client request.

* * * * *